United States Patent [19]

Bannon

[11] Patent Number: 4,954,294

[45] Date of Patent: Sep. 4, 1990

[54] VAPOR/LIQUID CONTACT APPARATUS

[75] Inventor: Robert P. Bannon, Houston, Tex.

[73] Assignee: Shell Oil Company, Houston, Tex.

[21] Appl. No.: 392,314

[22] Filed: Aug. 11, 1989

[51] Int. Cl.$^5$ .............................................. B01F 3/04
[52] U.S. Cl. .................................................. 261/114.1
[58] Field of Search ..................................... 261/114.1

[56] References Cited

U.S. PATENT DOCUMENTS

| 1,598,772 | 9/1926 | Gilmore | 261/114.1 |
| 1,862,758 | 6/1932 | Merley . | |
| 2,725,343 | 11/1955 | Lambert | 196/114 |
| 2,853,281 | 9/1958 | Hibshman et al. | 261/114.1 |
| 2,902,413 | 9/1959 | Kassel et al. | 261/114.1 |
| 3,053,521 | 9/1962 | Plaster et al. | 261/114.1 |
| 3,103,545 | 9/1963 | Korelitz | 261/114 |
| 3,168,600 | 2/1965 | Martin | 261/140 |
| 4,066,416 | 1/1978 | Panon et al. | 23/283 |
| 4,273,618 | 6/1981 | Strang, Sr. | 202/158 |
| 4,315,803 | 2/1982 | Strang, Sr. | 202/158 |
| 4,374,000 | 2/1983 | Abernathy et al. | 203/9 |
| 4,442,048 | 4/1984 | Abernathy et al. | 261/114 R |
| 4,547,326 | 10/1985 | Wesley | 261/114.1 |

FOREIGN PATENT DOCUMENTS

| 943527 | 3/1956 | Fed. Rep. of Germany | 261/114.1 |
| 875206 | 6/1942 | France | 261/114.1 |
| 102216 | 8/1941 | Sweden | 261/114.1 |
| 823610 | 11/1959 | United Kingdom | 261/114.1 |

Primary Examiner—Tim Miles
Attorney, Agent, or Firm—Ronald R. Reper

[57] ABSTRACT

An apparatus and method for sealing vapor/liquid contacting trays on startup of a downcomer-equipped vapor/liquid contactor comprising a series of gas/liquid contacting trays, at least some of said trays having a weir to maintain a liquid level thereon, a downcomer whereby liquid may flow down to the next lower tray and a seal area positioned underneath said downcomer for providing a liquid seal between successive trays in said series which comprises, prior to full liquid loading of a tray, collecting a portion of the first liquid on said tray, and passing it directly to said seal area positioned underneath said downcomer.

4 Claims, 1 Drawing Sheet

U.S. Patent     Sep. 4, 1990     4,954,294
FIG.1
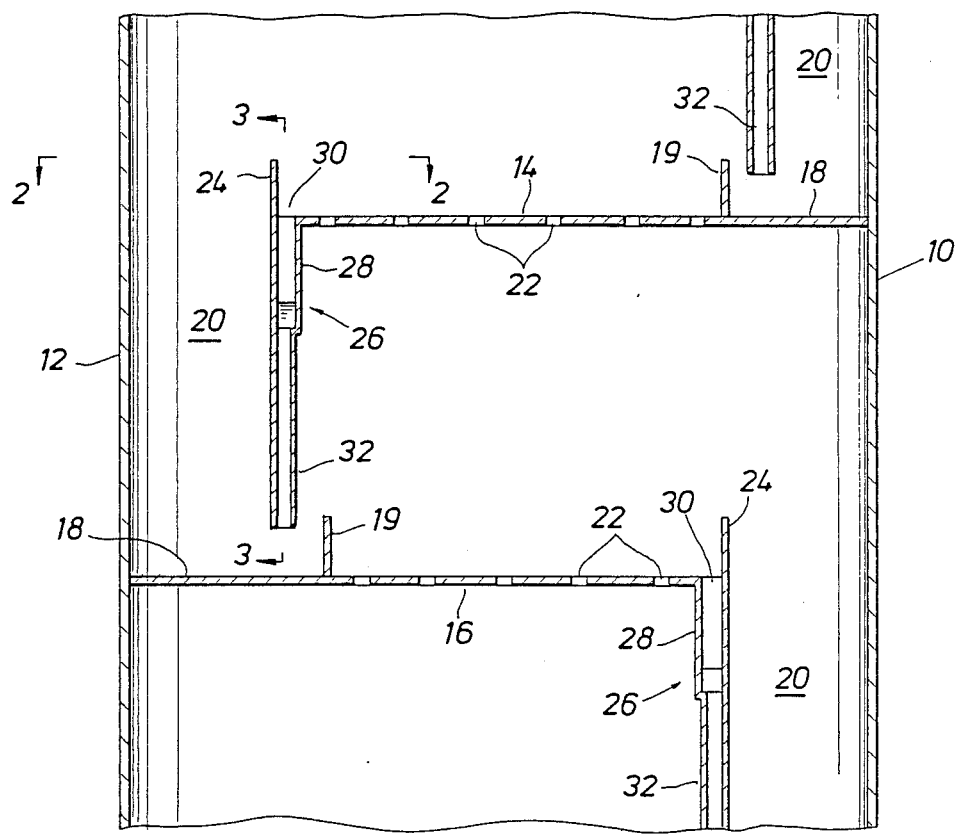
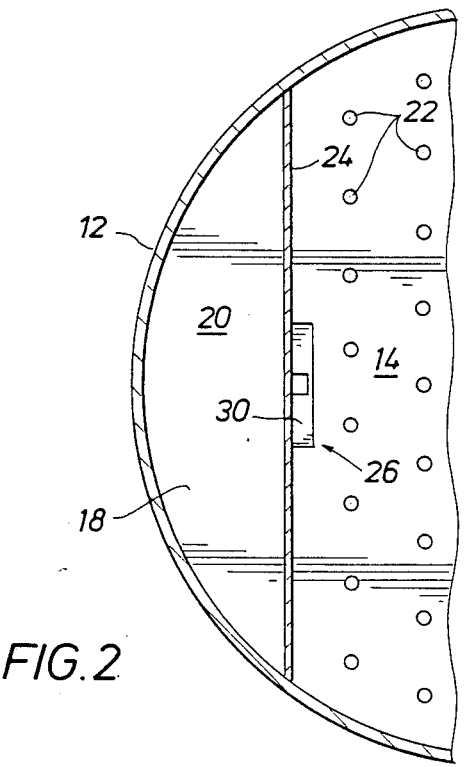
FIG.2
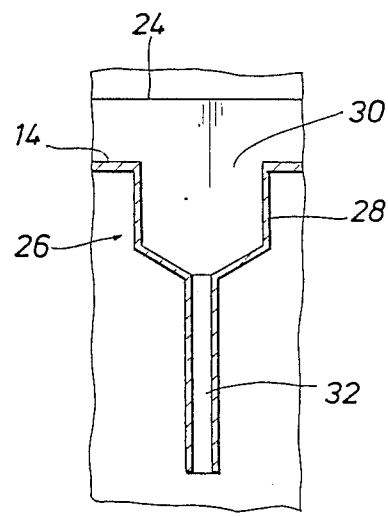
FIG.3

VAPOR/LIQUID CONTACT APPARATUS

BACKGROUND OF THE INVENTION

This invention relates to improvements in vapor/liquid contact apparatus and more particularly to an improved sealing vapor/liquid contact tray downcomer construction for absorption and similar towers or columns.

A major concern in commencing operation of a tray-containing vapor/liquid contacting apparatus such as an absorption or a distillation column is the sometimes difficult problem of establishing a liquid seal in the downcomers.

In conventional operation of a countercurrent vapor/liquid contacting tray (also referred to herein as a deck) vapor flows upwardly through tray perforations and liquid flows through the downcomer. The liquid seal at the bottom of the downcomer keeps vapor from entering the downcomer and the velocity of the vapor keeps most of the liquid from weeping through the tray perforations.

During startup of the apparatus, a reverse situation occurs. Until a downcomer seal is established, vapor flows upwardly through the downcomer as well as the tray perforations, and at low vapor velocity the liquid pours through the perforations rather than flow across the tray and outlet weirs to reach the downcomers. As vapor and liquid rates are increased the situation may occur that, before the liquid rate is high enough to seal the downcomer, the vapor flow up the downcomer is sufficient to prevent liquid downflow. In the current art, the start-up procedure must be changed or the trays/downcomers modified to avoid this problem.

When designing a vapor/liquid contactor, the traditional way to widen the operating conditions over which downcomer sealing and successful column startup can occur is to use smaller clearance area under the downcomers; however, the need to accommodate high flow rates in operation may make it impossible to reduce the clearance area enough to avoid a sealing problem on startup. Further, low downcomer clearance in a seal pan (typically on the bottom tray downcomer) runs the risk of plugging caused by deposition of solids, which solids may be present in or formed during processing of the contact fluids.

Another traditional way of promoting successful contactor startup is to incorporate recessed inlet pans; however, this is a relatively costly solution. Moreover, like the low downcomer clearance there remains a possibility of plugging. Further, inlet pans have the additional disadvantage of a lower separation efficiency, especially in small columns, since the flow through the requisite drain holes bypasses two column trays.

The present invention provides a novel method and apparatus to seal vapor/liquid contacting trays on startup.

SUMMARY OF THE INVENTION

The invention provides apparatus for sealing vapor/liquid contacting trays on startup in a downcomer-equipped vapor/liquid contactor, said apparatus comprising:

a downcomer-equipped upright vapor/liquid contacting column, comprising a series of gas/liquid contacting trays, at least some of said trays having associated therewith a weir to maintain a liquid level thereon, a downcomer whereby liquid may flow down to the next lower tray and into a liquid seal area formed by an inlet weir or seal pan, said seal area being positioned underneath said downcomer for providing a liquid seal between successive trays in said series; and .collecting means, provided on at least one said contacting tray having said weir, said downcomer and said seal area associated therewith, and said collecting means having an upper part disposed at an elevation between that of said tray and below said weir and having a lower part disposed to provide liquid to said seal area, said collecting means being dimensioned for collecting liquid from said tray so that no appreciable level has to build up on said tray before it flows into and through said lower part into said seal area which is disposed underneath said downcomer.

The invention further provides a method for startup of an upright downcomer-equipped vapor/liquid contactor comprising a series of gas/liquid contacting trays, at least one of said trays having associated therewith a weir to maintain a liquid level thereon during normal operation, a downcomer whereby liquid may flow down to the next lower tray, and a seal area positioned underneath said downcomer for providing a liquid seal between successive trays in said series, which method comprises:

starting said apparatus with vapor and liquid at operating conditions substantially less than conditions during normal operation;

collecting, prior to flow of liquid on said tray over said weir and through said downcomer, a portion of the first liquid on said tray; and passing it directly to said seal area underneath said downcomer.

BRIEF DESCRIPTION OF THE DRAWINGS

The invention will be further explained with reference to the accompanying drawings wherein:

FIG. 1 is a partial vertical cross-sectional view of a vapor/liquid contactor apparatus tray provided with collection means according to the invention.

FIG. 2 is a fragmentary top plan view of the tray taken along the line 2—2 of FIG. 1.

FIG. 3 is a fragmentary vertical cross-sectional view of the collecting means taken along line 3—3 of FIG. 1.

DESCRIPTION OF PREFERRED EMBODIMENTS

The apparatus of this invention may be applied to any of the well known columns for countercurrent contacting of a vapor and a liquid, such as fractionating columns, absorbing columns, rectifying columns, scrubbing columns and the like. Further, the apparatus of the invention may be suitably applied with all types of trays, e.g., sieve, bubble cap, valve tray, etc., and all types of downcomers.

Referring now to the drawings, FIG. 1 is a schematic partial-sectional view of an upright, downcomer equipped vapor/liquid contactor 10 showing a portion of contactor wall 12 and two of the internal vapor/liquid contact trays 14 and 16, respectively. A seal area 18 formed by inlet weir 19 is shown under the downcomer area 20 of each tray. The bottom tray of a series of trays will typically have a sealing area formed by a seal pan (not shown) rather than an inlet weir. Said trays 14 and 16 in a preferred embodiment are perforated plates, having a plurality of perforations 22 to facilitate vapor/liquid contact during normal operation. Said trays 14 and 16 each have a weir 24, also referred to herein as a baffle, to maintain a liquid level on said trays during normal operation. In accordance with the invention, the trays further contain collecting means 26 with an upper part 28 having an opening 30 at an elevation substantially that of the tray deck it depends from, and having a substantially narrower lower part 32 disposed to deliver liquid flowing downwardly therethrough into said seal area 18. Preferably said collecting means 26 is disposed on said trays 14 and 16 proximate to said weir 24, and most preferably as close to said weir as possible to avoid bypassing of the active area of the tray during normal operation.

It is preferred that the top of collecting means 26 have an elevation even with the tray deck so during startup no appreciable liquid level has to buildup on the tray before liquid flows into said collecting means. Thus tray pressure drop and downcomer gas flow are low when sealing liquid becomes available and is provided by collecting means 26 to seal area 18. FIG. 2 is a top plan view showing a preferred embodiment wherein collecting means 26 is disposed as close as possible to weir 24. FIG. 3 is a fragmentary vertical section along line 3—3 of FIG. 1 illustrating an embodiment of collection means 26, having opening 30 in upper part 28 of larger area than the discharge opening in the lower part 32. The cross-sectional area of opening 30 of collecting means 26 needs to be large enough so that during startup vapor flowing up the lower part 32 at the time liquid reaches said opening 30, will not blow liquid out of the upper part of collecting means 28. The depth of said upper part 28 should be sufficient to make it possible to build up enough head to stop vapor flow and to allow the liquid to flow down the tube. Moreover, the area of the lower part should not be so large as to appreciably reduce froth height on the tray during normal operation since it is, in effect, a weir bypass. The upper part 28 of collecting means 26 preferably should have a cross-sectional area no less than about twice the cross-sectional area of the lower part 32 of collecting means 26. Further, the vertical height of upper part 28 preferably should be equal to or greater than the tray liquid height equivalent to the dry tray pressure drop at normal vapor rates.

What is claimed is:

1. Apparatus for sealing vapor/liquid contacting trays on startup in a downcomer-equipped vapor/liquid contactor, said apparatus comprising:

at least one downcomer-equipped upright vapor/liquid contacting column, comprising a series of gas/liquid contacting trays, at least some of said trays having associated therewith a weir to maintain a liquid level thereon, a downcomer whereby liquid may flow down to the next lower tray and a seal pan positioned underneath said downcomer for providing a liquid seal between successive trays in said series; and collecting means, provided on at least one said contacting tray having said weir, said downcomer and said seal pan associated therewith, and said collecting means having an upper part disposed at an elevation substantially at the elevation of the tray it is disposed on, and said upper part of said collecting means being dimensioned to provide sufficient liquid depth to permit flow of liquid and preclude gas flow through a lower part of said collecting means during start-up conditions; said collecting means having a lower part disposed to provide liquid to said seal pan, said collecting means being dimensioned for collecting liquid from said tray so that no appreciable level has to build up on said tray before it flows into and through said lower part into said seal pan which is disposed underneath said downcomer.

2. Apparatus as in claim 1, wherein said collecting means is disposed on said tray proximate to said weir.

3. Apparatus as in claim 1, wherein said lower part of said collecting means is dimensioned to limit liquid flow therethrough so as to not substantially reduce froth height of liquid on said tray during normal operations.

4. Apparatus as in claim 1, wherein said collecting means has an upper part having a cross-sectional area at least two times greater than the cross-sectional area of said lower part.

* * * * *